United States Patent
Brugerolle et al.

(10) Patent No.: US 6,568,207 B1
(45) Date of Patent: May 27, 2003

(54) INTEGRATED PROCESS AND INSTALLATION FOR THE SEPARATION OF AIR FED BY COMPRESSED AIR FROM SEVERAL COMPRESSORS

(75) Inventors: Jean-Renaud Brugerolle, Paris (FR); Bao Ha, San Ramon, CA (US)

(73) Assignee: L'Air Liquide-Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 10/050,145

(22) Filed: Jan. 18, 2002

(51) Int. Cl.$^7$ .................................................. F25J 1/00
(52) U.S. Cl. ........................... 62/643; 60/39.12; 62/915
(58) Field of Search ..................... 62/643, 915; 60/729, 60/39.12

(56) References Cited

U.S. PATENT DOCUMENTS

| | | | | | |
|---|---|---|---|---|---|
| 4,250,704 A | * | 2/1981 | Bruckner et al. | ........... | 60/39.12 |
| 4,785,621 A | * | 11/1988 | Alderson et al. | ........... | 60/39.12 |
| 5,459,994 A | * | 10/1995 | Drnevich | ................... | 60/39.12 |
| 5,979,183 A | * | 11/1999 | Smith et al. | ................... | 62/915 |
| 6,062,043 A | * | 5/2000 | Magnet et al. | ................. | 62/643 |

* cited by examiner

Primary Examiner—Ronald Capossela
(74) Attorney, Agent, or Firm—Young & Thompson

(57) ABSTRACT

In an integrated process an air separation unit A receives compressed air from the compressor S of a blast furnace B and the compressor K of a gas turbine C. Nitrogen enriched air N from the air separation unit is sent to the gas turbine and oxygen enriched air O from the air separation unit is sent to the blast furnace.

13 Claims, 2 Drawing Sheets

INTEGRATED PROCESS AND INSTALLATION FOR THE SEPARATION OF AIR FED BY COMPRESSED AIR FROM SEVERAL COMPRESSORS

FIELD OF THE INVENTION

The invention related to an integrated process wherein an air separation unit is integrated with a gas turbine and a unit consuming oxygen enriched air, such as a blast furnace.

BACKGROUND OF THE INVENTION

The standard method for increasing the oxygen content of the blast sent to a blast furnace is to add relatively pure oxygen to a pressurised air stream. The oxygen comes from an air separation unit as described for example in U.S. Pat. No. 6,119,482, U.S. Pat. No. 5,244,489 and EP-A-0531182. In terms of energy, the cost of 1 $Nm^3/h$ of oxygen produced using a mixing column is 0,32 $KWh/Nm^3$ of oxygen.

U.S. Pat. No. 4,962,646, U.S. Pat. No. 5,295,351, U.S. Pat. No. 5,268,019 and U.S. Pat. No. 5,317,862 describe processes in which air from the compressor of a gas turbine is fed to an air separation unit. The oxygen produced by the air separation unit is sent to a blast furnace.

U.S. Pat. No. 6,089,040 describes a process in which a blower supplies air to a blast furnace and to an air separation unit which, in turn, provides oxygen for the blast furnace. Air is also sent to the air separation unit via a dedicated compressor and nitrogen from the air separation unit is sent to a gas turbine.

The present invention is intended to provide particularly low cost oxygen on a site where an air separation unit, a gas turbine and a blast furnace (or similar oxygen enriched air consuming unit) are present. Using the invention, the value of the oxygen in terms of energy falls below 0,2 $KWh/Nm^3$.

All pressures mentioned are absolute pressures, all percentages are molar percentages and enriched fluids are enriched in the component mentioned with respect to air.

SUMMARY OF THE INVENTION

BRIEF DESCRIPTION OF THE INVENTION

Figure 1:
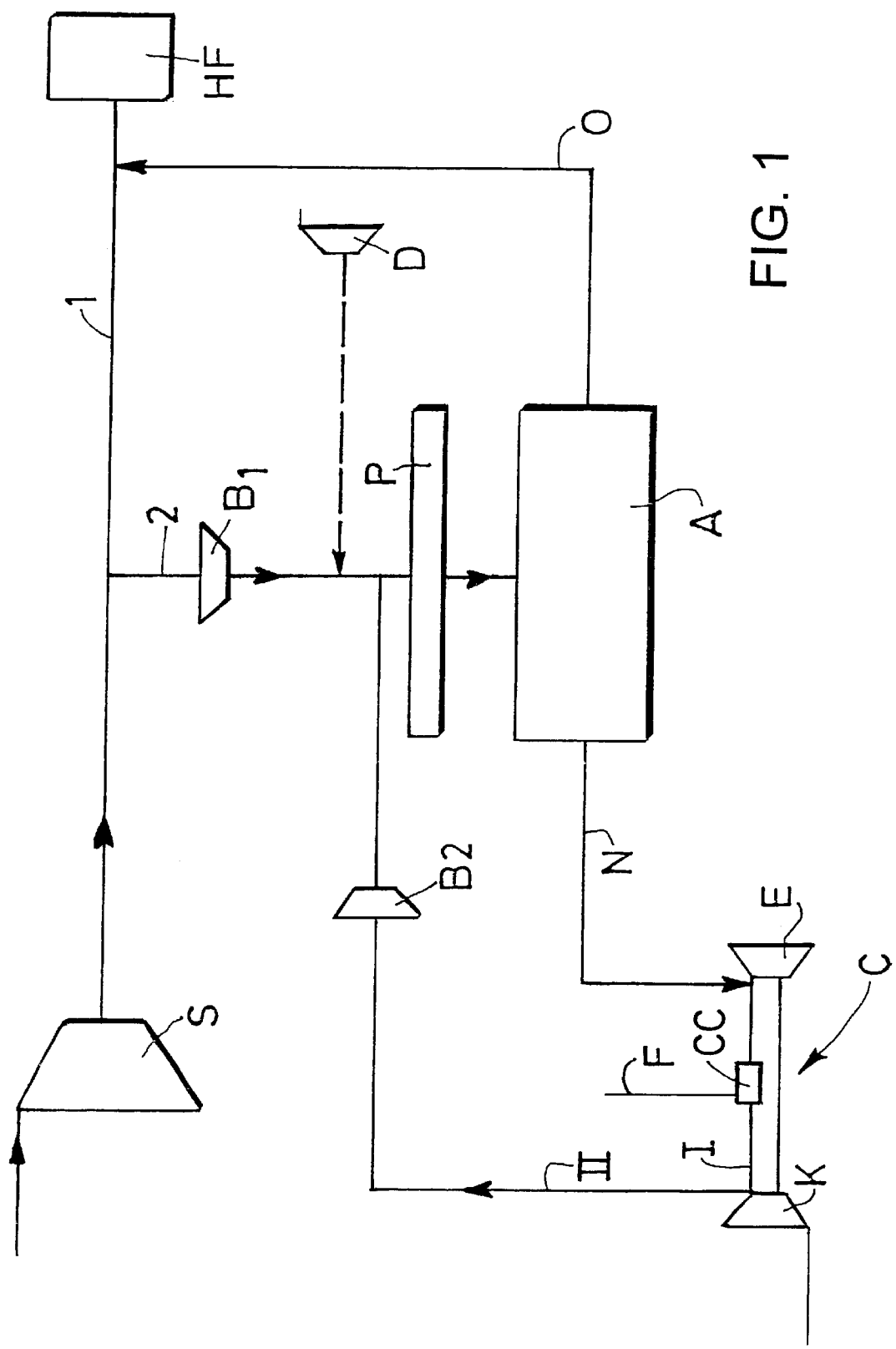
Figure 2:
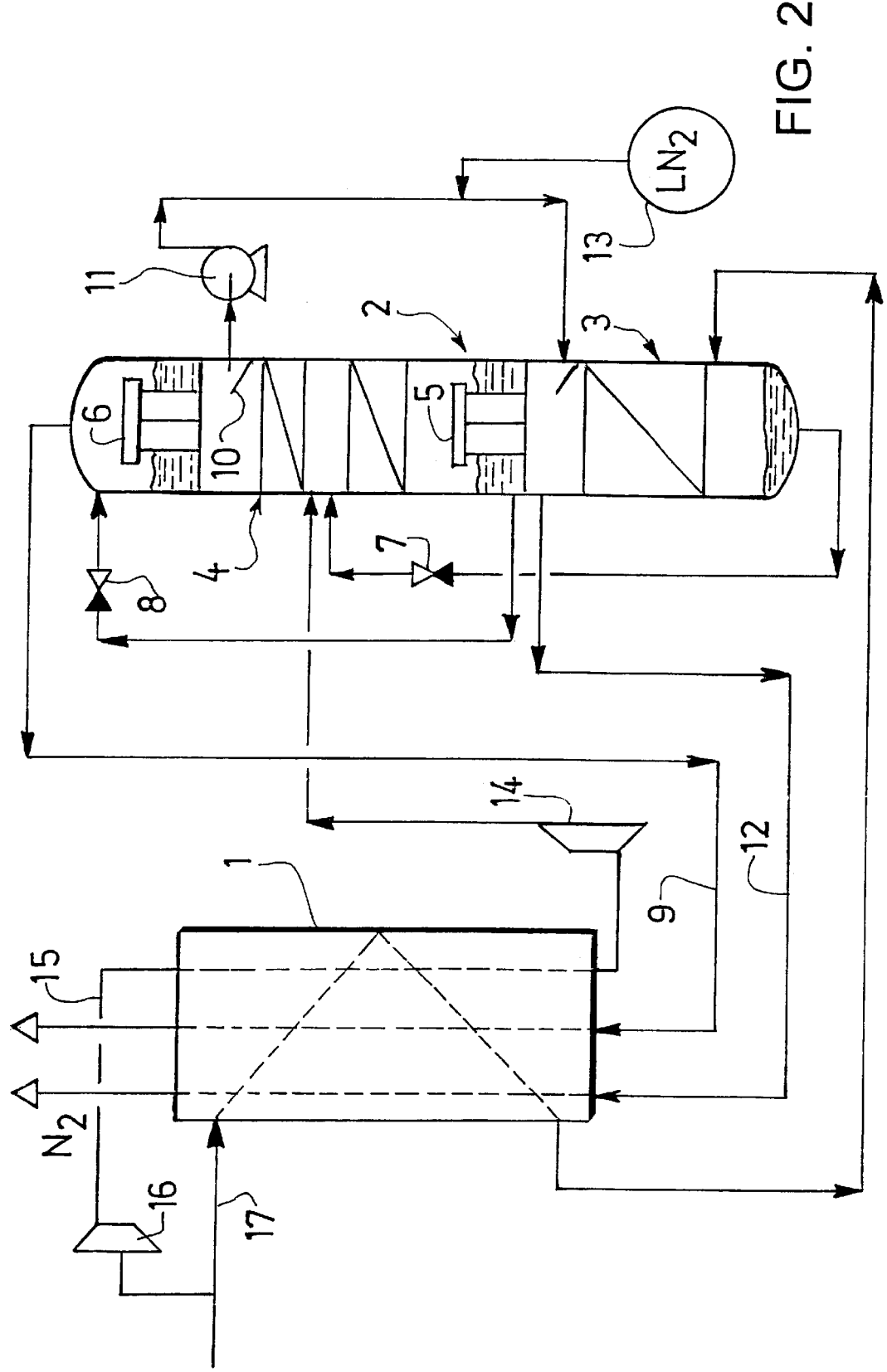

FIG. 1 shows an integrated installation for operating the process according to the invention and FIG. 2 shows an air separation unit suitable for use in the integrated process.

DETAILED DESCRIPTION OF THE INVENTION

In FIG. 1 an integrated installation comprises an air separation unit A, a blast furnace HF and a gas turbine C.

The gas turbine C comprises a compressor K, a combustion chamber CC and an expander E.

A first portion of air I from the compressor K is sent to the combustion chamber with fuel F and produces combustion gases which are subsequently expanded in the expander E.

The air separation unit is a cryogenic distillation unit and may comprise any suitable column system including a single column, double column or triple column. Preferably the system used will be as described in FIG. 2.

Air is compressed in a first compressor S and a first part of air 1 is sent to the blast furnace HF. A second part 2 of the air is further compressed in a booster compressor B1 to 17 bar and sent to the purification unit P.

A second portion II of the air from the gas turbine compressor K is also sent to a booster compressor B2 where it is compressed to the same pressure (17 bar), mixed with the air from booster B1 and sent to the same purification unit P.

If the outlet pressures of the compressors S,K are the same, a single booster can be used to compress the second part 2 of compressed air and the second portion II of compressed air.

The purified mixed air stream is sent to the air separation unit A and product streams O,N are removed therefrom. The oxygen enriched stream O is sent to the blast furnace HF and the nitrogen enriched stream N is sent to the gas turbine C. Other products may of course be produced and sent elsewhere.

As shown in dashed lines the air separation unit may also be fed with air from a dedicated compressor D. This may facilitate start-up or operation of the system when the gas turbine and/or blast furnace are not in operation.

The booster compressors B1,B2 and/or the dedicated compressor may be coupled to steam turbines present on the site or to the expander E of the gas turbine.

FIG. 2 shows an air separation unit known as an 'Azotonne' similar to that described in U.S. Pat. No. 4,717,410 but differs slightly therefrom, in particular in that it operates at a considerably higher pressure.

DETAILED DESCRIPTION OF THE INVENTION

The installation for producing pure nitrogen diagrammatically represented FIG. 2 is an installation with an expansion turbine. It comprises a thermal exchange line 1 and a double distillation column 2. The latter is formed by a lower main column 3 operating at high pressure, i.e. at the production pressure, on the order of 15 to 20 bars abs, and an upper auxiliary column 4 for operating at a medium pressure, on the order of 10 to 15 bars abs. Each of these columns has a top condenser 5, 6 respectively.

Purified air, compressed to a pressure slightly higher than the high pressure is divided into two parts. The first part 17 is cooled in the heat exchange line 1 and sent to the bottom of the high pressure column 3. The second part 15 is compressed in booster 16 to a pressure between 20 and 25 bars, cooled in the heat exchange line 1, and expanded in turbine 14. The rich liquid in equilibrium with the air, received at the base of the column 3, is expanded to the medium pressure in an expansion valve 7 and introduced at an intermediate point of column 4. In the later, the descending liquid is enriched in oxygen and cools the main condenser 5 at the base of the column so as to ensure the reflux in the column 3. A part of the same liquid is again expanded to a pressure slightly higher than atmospheric pressure in an expansion valve 8 and then serves to cool the auxiliary condenser 6 and ensure the reflux in the column 4. The same liquid, after vaporization, is sent in countercurrent manner by a conduit 9 through the exchange line 1 so as to constitute the residual gas of the installation.

The vapor which rises in the column 4 is progressively enriched in nitrogen, and it is pure nitrogen which is condensed by the upper condenser 6. A fraction of the condensed flow is received in a drain 10, withdrawn from the column 4 and brought back by a pump 11 to the high pressure and reinjected at the top of the column 3. The gaseous nitrogen is withdrawn at the top of the latter and sent in a countercurrent manner by a conduit 12 through the exchange line 1 for the purpose of its utilization.

The installation may optionally or additionally be cooled by an additional supply of liquid nitrogen under high pressure coming from an exterior source 13, this liquid nitrogen being introduced at the top of the column 3. The energy contained in the rich liquid under high pressure is used not only for achieving the distillation in this column 3, as is conventional, but also for distilling this liquid in the column 4 and thus increasing the production of nitrogen by means of the quantity withdrawn at the top of the column 4.

In the case where the feed air is at 17 bar, the high pressure column operates at 17 bar, the low pressure column operates at 11 bar and the top condenser 6 is at 5,6 bar. 6% of the air is expanded in turbine 14. The rich liquid contains 32 mol % oxygen and the products are nitrogen 12 at 16,5 bar, representing 54% of the air which may be sent to the combustion chamber or the expander of the gas turbine after a small compression step and a gas 9 containing 44–46 mol % oxygen at 5,4 bar which may be sent to the metal treatment unit, (e.g. blast furnace).

The column internals are preferably structured packing.

What is claimed is:

1. Process for feeding oxygen to a unit consuming oxygen-enriched air comprising the following steps:

compressing a first stream of air in a first compressor so as to obtain a first stream of compressed air;

dividing said first stream of compressed air into a first part and a second part;

sending the first part to a unit consuming oxygen-enriched air;

purifying the second part in a purification unit to obtain purified air;

sending the purified air to a separation unit to produce at least one stream enriched in oxygen, and one stream enriched in nitrogen;

sending at least part of the steam enriched in oxygen to the unit consuming oxygen;

providing a gas turbine comprising a combustion chamber and a gas turbine compressor;

compressing a second stream of air in the gas turbine compressor to obtain a second stream of compressed air;

dividing said second stream of compressed air into a first fraction and a second fraction;

sending the first fraction to the combustion chamber;

sending the second fraction to the purification unit to obtain a purified second fraction; and sending the purified second fraction to the air separation unit.

2. The process according to claim 1, further comprising compressing a third stream of air in a dedicated compressor to obtain a third stream of compressed air and sending said third stream of compressed air to the air separation unit.

3. The process according to claim 1, wherein the gas turbine comprises an expander, and at least one stream enriched in nitrogen is sent to the gas turbine to a point upstream of said expander.

4. The process according to claim 1, wherein the second part and the second fraction are mixed and purified together in a single purification unit to remove carbon dioxide and water.

5. The process according to claim 2, wherein the second part, the second fraction, and the third stream of compressed air are mixed and purified together in a single purification unit to remove carbon dioxide and water.

6. The process according to claim 1, wherein the second part is further compressed to a higher pressure downstream of the first compressor and upstream of the purification unit.

7. The process according to claim 1, wherein the second fraction is further compressed to a higher pressure downstream of the gas turbine compressor and upstream of the purification unit.

8. The process according to claim 1, wherein the unit consuming oxygen-enriched air is a metal processing furnace.

9. The process according to claim 1, wherein the air separation unit comprises a high pressure column and a low pressure column thermally coupled by a condenser-reboiler; the high pressure column operating at a pressure between 12 and 20 bar abs.

10. An integrated apparatus for feeding oxygen to a unit consuming oxygen-enriched air comprising:

a first compressor for compressing a first stream of air and obtain a first stream of compressed air;

means for dividing said first stream of compressed air into a first part and a second part;

at least one purification unit;

an air separation unit;

a unit consuming oxygen-enriched air;

conduit means for sending the first part to said unit consuming oxygen-enriched air;

conduit means for sending the second part to the purification unit and then to the air separation unit;

a second compressor for compressing a second stream of air and obtain a second stream of compressed air;

means for dividing the second stream of compressed air into a first fraction and a second fraction;

at least one gas turbine comprising a combustion chamber and a gas turbine compressor;

conduit means for sending the first fraction to the combustion chamber;

conduit means for sending the second fraction to a purification unit and then to the air separation unit; and said air separation unit having a first outlet for removing an oxygen-enriched fluid, and a second outlet for removing a nitrogen-enriched fluid.

11. The integrated apparatus according to claim 10, further comprising conduit means for sending oxygen enriched fluid from the air separation unit to the unit consuming oxygen-enriched air.

12. The integrated apparatus according to claim 10, further comprising conduit means for sending nitrogen enriched fluid from the air separation unit to the gas turbine.

13. The integrated apparatus according to claim 10, further comprising at least one additional compressor for increasing the pressure of at least one of the second part and the second portion upstream of the purification unit.

* * * * *